United States Patent
Uetake (10) Patent No.: US 8,841,992 B2
(45) Date of Patent: Sep. 23, 2014

(54) TERMINAL DEVICE AND CONTROL METHOD FOR TERMINAL DEVICE

(75) Inventor: Tatsuya Uetake, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 393 days.

(21) Appl. No.: 12/868,154

(22) Filed: Aug. 25, 2010

(65) Prior Publication Data

US 2011/0163861 A1 Jul. 7, 2011

(30) Foreign Application Priority Data

Jan. 6, 2010 (JP) ................ P2010-001268

(51) Int. Cl.
*G08B 6/00* (2006.01)
*G06F 3/01* (2006.01)
*G06F 3/0488* (2013.01)

(52) U.S. Cl.
CPC .............. *G06F 3/016* (2013.01); *G06F 3/0488* (2013.01)
USPC ..................................................... 340/407.2

(58) Field of Classification Search
CPC ................................ G06F 3/016; G06F 3/0488
USPC ............... 340/407.2, 545.4, 621, 683, 686.3, 340/7.58, 7.6, 384.6
See application file for complete search history.

(56) References Cited

U.S. PATENT DOCUMENTS

| | | | |
|---|---|---|---|
| 4,435,751 A * | 3/1984 | Hori et al. ..................... 700/280 |
| 5,221,882 A * | 6/1993 | Hirata ............................ 318/560 |
| 5,768,730 A * | 6/1998 | Matsumoto et al. .............. 8/159 |
| 6,680,729 B1 | 1/2004 | Shahoian et al. |
| 7,292,227 B2 * | 11/2007 | Fukumoto et al. ............ 345/173 |
| 2007/0178942 A1 | 8/2007 | Sadler et al. |
| 2008/0117175 A1 | 5/2008 | Linjama et al. |
| 2009/0295552 A1 * | 12/2009 | Shahoian et al. .......... 340/407.1 |
| 2009/0313542 A1 | 12/2009 | Cruz-Hernandez et al. |

FOREIGN PATENT DOCUMENTS

JP    2003 330618    11/2003

OTHER PUBLICATIONS

European Search Report dated May 8, 2013.

* cited by examiner

*Primary Examiner* — Brian Zimmerman
*Assistant Examiner* — Bhavin M Patel
(74) *Attorney, Agent, or Firm* — Frommer Lawrence & Haug LLP; William S. Frommer; Ellen Marcie Emas (57) ABSTRACT

A terminal device includes an operation section in which an operation instruction is performed by being touched with a finger or a pen; an operation detection section that detects that the finger or the pen touches the operation section; a vibration motor that rotates a shaft with a weight having a center of gravity at a position that is shifted from a rotation center; a vibration state detection section that detects state of vibration caused by rotation of the shaft of the vibration motor; and a control section that starts the rotation of the vibration motor when the operation detection section detects the touching, and stops the rotation of the vibration motor when a phase detected by the vibration state detection section falls within a predetermined range.

16 Claims, 8 Drawing Sheets

TERMINAL DEVICE AND CONTROL METHOD FOR TERMINAL DEVICE

BACKGROUND OF THE INVENTION

1. Field of the Invention

The present invention relates to a terminal device preferably applied as a mobile phone and a control method applied to the terminal device, and particularly, to a technique applied to a terminal device having a vibrator for notifying an incoming call and the like.

2. Description of the Related Art

In the past, there has been widely used a mobile phone that has a vibrator for vibrating its body and has a function of notifying incoming calls or mails by vibration of the vibrator, instead of ringing. Such vibrator is configured, for example, such that an eccentric weight, which is attached to a rotation shaft, is rotated by a motor (vibration motor).

To vibrate the vibrator in the mobile phone, the vibrator is, for example, operated continuously or intermittently during calling operation. Therefore, for example, if the calling operation continues for a relatively long period of time of several tens of seconds, the vibrator is also operated continuously or intermittently for the long period of time.

In addition to the usage of the vibrator continuously operating as described above, there exists a case where, at the time of operating a touch panel of the terminal device by finger touch, the terminal device is temporarily vibrated by the vibrator in order to feed back to the touching finger that the operation is made. With the feedback of the operation by the vibration as described above, an operator can obtain a sense of operation similar to that in a case of operating a general keyboard and can obtain a favorable operability, even in a case of using the touch panel.

Japanese Unexamined Patent Application Publication No. 2003-330618 describes a terminal device having a touch panel, in which, when the touch panel is touched, pulse signals are supplied to a vibrating element and the vibrating element is temporarily vibrated to implement the feedback.

SUMMARY OF THE INVENTION

In general, a vibrator that a mobile phone has is configured such that a vibrating element formed with a weight is rotated by a motor, and, this configuration is aimed at vibrating the element continuously for some period of time and is not aimed at providing the pulse-type vibration temporarily. To temporarily generate the pulse-type vibration by using this type of vibrator, the motor is temporarily driven for an significantly short time to rotate the vibrating element for a short period of time. By employing as the motor, for example, a stepper motor of which rotational phase can be controlled and rotating the vibrating element by using the stepper motor for a limited cycle, it may be possible to drive the motor so as to temporarily generate the pulse-type vibration as described above.

However, the stepper motor is an expensive motor, and, in general, a less-expensive, general direct-current motor is employed for the vibrating motor of the mobile phone. When the vibrating element is vibrated by the general motor of which rotational phase is not controlled, there may occur a case where, at the time of the temporary driving, a targeted vibration is not obtained, depending on the rotational phase of the vibrating element. Therefore, in the past, there existed limitations in a case of temporarily vibrating the terminal device by using the general vibrator.

It is desirable to favorably implement a mechanical-feedback operation in which a terminal device with a simple configuration is temporarily vibrated by using a vibrator that the terminal device has.

An embodiment of the present invention is applied to a terminal device having an operation section in which an operation instruction is performed by being touched with a finger or a pen and a vibration motor that rotates a shaft with a weight having a center of gravity at a position that is shifted from a rotation center.

Then, an operation detection process that detects that the finger or the pen touches the operation section is implemented. Additionally, a vibration state detection process that detects a state of vibration caused by rotation of the shaft of the vibration motor is implemented. Furthermore, a control process that starts the rotation of the vibration motor when the operation detection section detects the touching in the operation detection process, and stops the rotation of the vibration motor when a phase detected in the vibration state detection process falls within a predetermined range is implemented.

With the configuration described above, by detecting the state of the vibration in the vibration state detection process and stopping the driving by the vibration motor when the phase in the predetermined range is detected, it becomes possible to provide vibration in a certain state for a short period of time. In this case, for the detection of the state of the vibration, a member that the terminal device has, such as a microphone or an acceleration sensor can be applied.

According to the embodiment of the present invention, by driving the vibration motor, and at the same time, detecting that the phase change falls within the predetermined phase range, and stopping the vibration motor, it becomes possible to control the temporary vibration with high accuracy, and to provide the feedback to the operation by the vibration. In this case, for the detection of the state of the vibration, a member that the terminal device has, such as a microphone or an acceleration sensor can be applied, whereby it become possible to provide the feedback to the operation by the vibration with the configuration in which a general vibration motor is used and the cost can be lowered.

DESCRIPTION OF THE PREFERRED EMBODIMENTS

Figure 7:
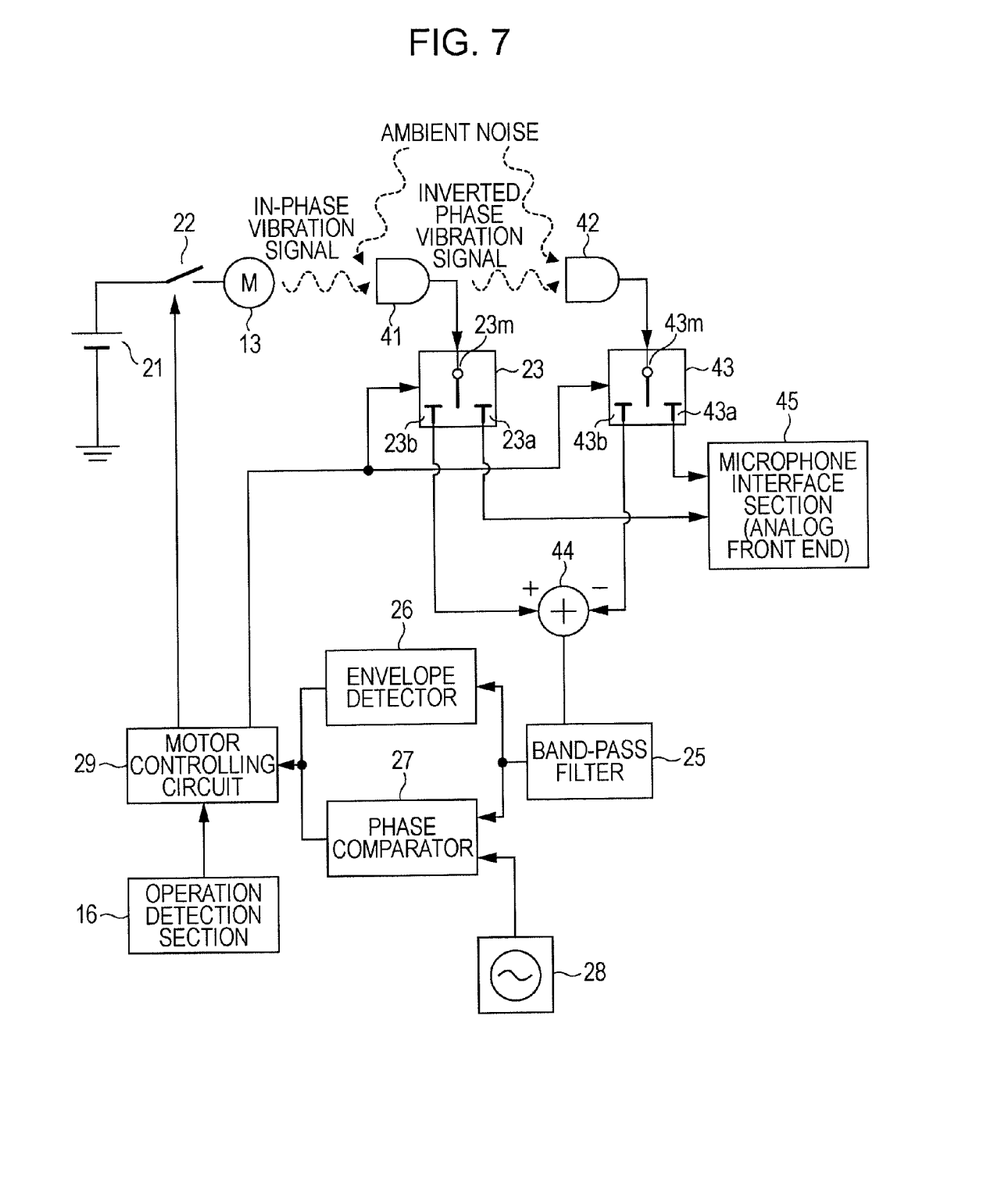
FIG. 7 is a block diagram showing a variation example (example of using a secondary microphone) according to the embodiment of the present invention; and, FIG. 8 is a perspective view showing an example of a shape of the terminal device in the example shown in FIG. 7.
Figure 8:
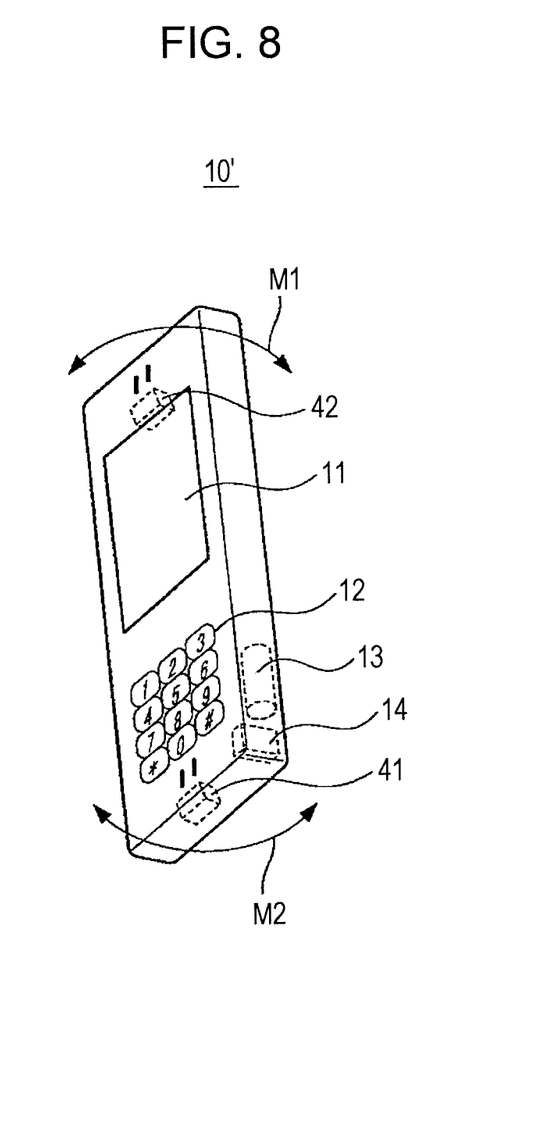

Hereinbelow, exemplary embodiments according to the present invention will be explained with reference to drawings in the following order.
1. Explanation of configuration of terminal device (FIG. 1, FIG. 2)
2. Explanation of control state of vibration motor (FIG. 3, FIG. 4)
3. Variation example 1: example of using dedicated microphone (FIG. 5)
4. Variation example 2: example of using acceleration sensor (FIG. 6)
5. Variation example 3: example of using secondary microphone (FIG. 7, FIG. 8)

1. Explanation of Configuration of Terminal Device

Figure 1:
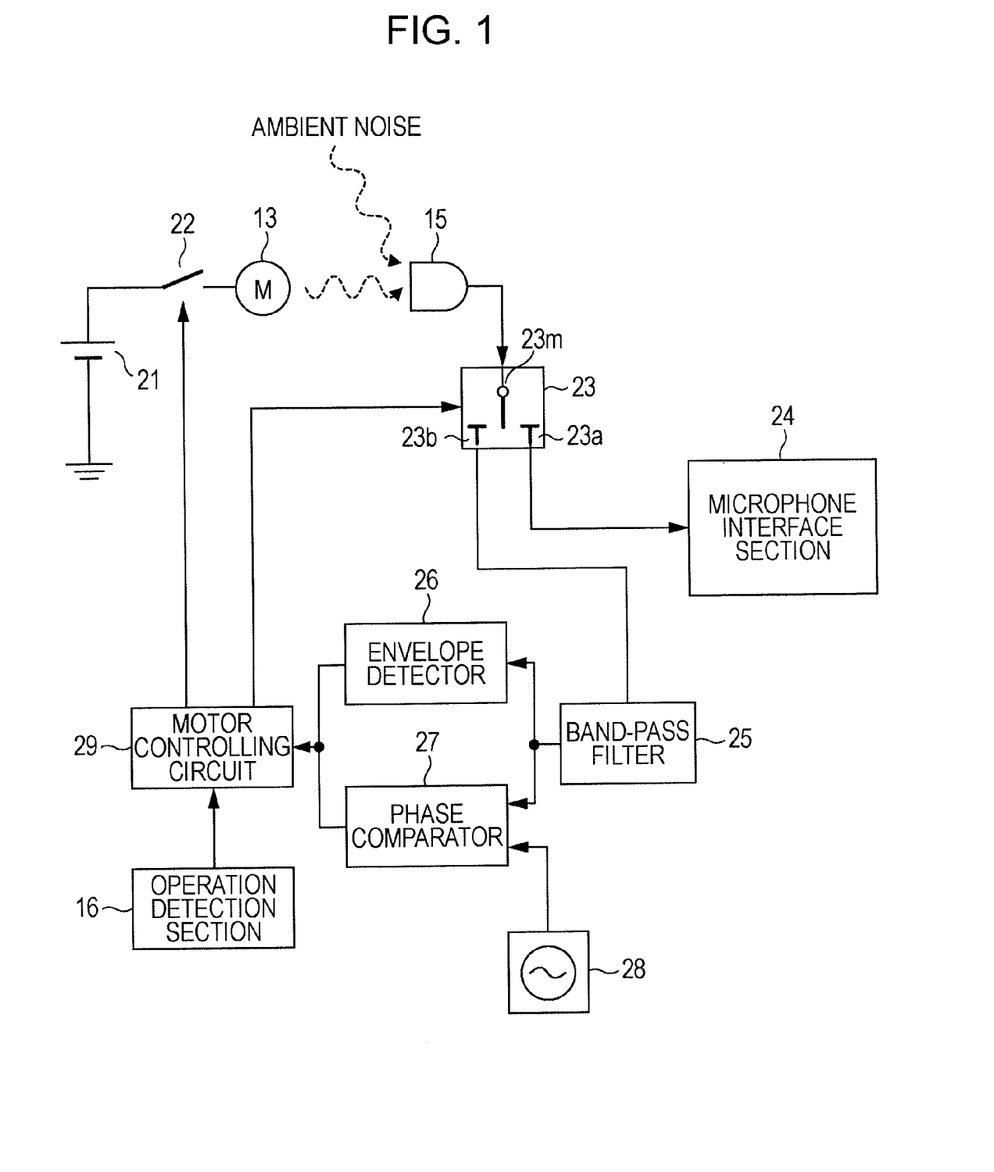
FIG. 1 is a block diagram showing an example of the configuration of a terminal device according to an embodiment of the present invention.
Figure 2:
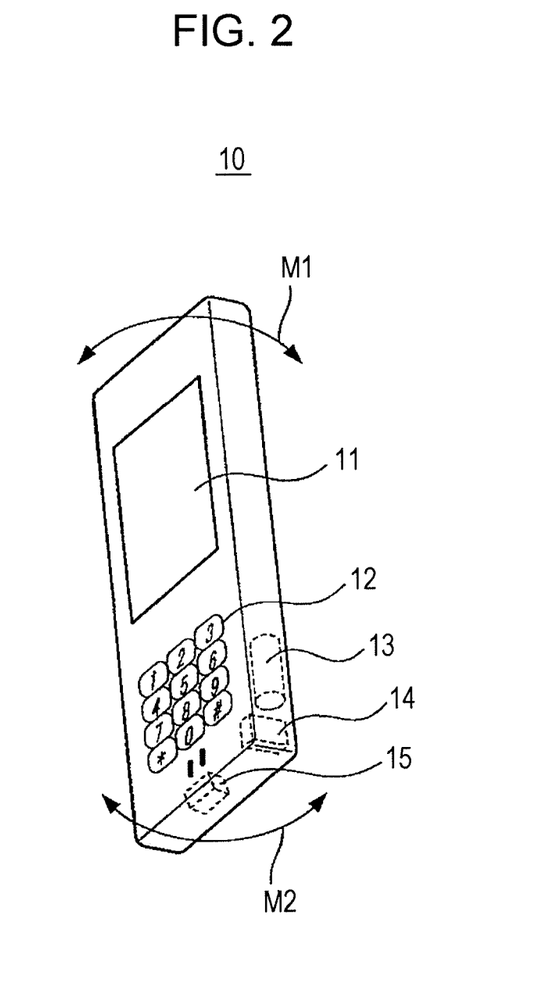
FIG. 2 is a perspective view showing an example of a shape of the terminal device according to the embodiment of the present invention.

FIG. 1 and FIG. 2 each illustrate the configuration of a terminal device according to this embodiment.

According to this embodiment, FIG. 2 shows an example in which this embodiment is applied to a terminal device 10, which is a mobile phone. The terminal device 10 shown in FIG. 2 has a touch panel 11 that can be operated by touching a display panel for displaying various kinds of information, operation keys 12 and the like. Additionally, the terminal device 10 has a vibration motor 13 and a vibrating element 14 that is rotated by driving the vibration motor 13. The vibration motor 13 and the vibrating element 14 function as a vibrator that vibrates the device housing (case) of the terminal device 10. The vibration motor 13 is formed by a brush-type direct-current motor, and the vibrating element 14 is attached to a rotation axis of the vibration motor 13 in a manner that is decentered from the rotation axis.

By rotating the vibrating element 14 by driving the vibration motor 13, a force acts, for example, in a direction indicated by a solid line M1 in FIG. 2, and the terminal device 10 is vibrated. Alternatively, a force acts in a direction indicated by a solid line M2 in FIG. 2, and the terminal device 10 is vibrated. The vibrator formed by the vibration motor 13 and the vibrating element 14 is operated continuously or intermittently when the terminal device 10 performs notification process, such as receipt of an incoming phone call or a mail, for the user by using the vibration. Here, in this embodiment, the vibration function as described above is applied to the feedback in which the terminal device 10 is temporarily vibrated, when the terminal device 10 detects that the user touches the touch panel 11 with the finger and so on.

Next, with reference to FIG. 1, the configuration in which the terminal device 10 is temporarily vibrated with the use of the vibration function will be explained.

To the vibration motor 13, the direct-current power supply is supplied from a power supply 21 through a switch 22, and the rotation of the vibration motor 13 is started or stopped in synchronization with the ON position or OFF position of the switch 22.

The open/close of the switch 22 is controlled by a motor controlling circuit 29 that functions as a control section of the vibrator. To the motor controlling circuit 29, the detection signal concerning the vibration state of the vibration motor 13 is supplied.

The configuration of generating the detection signal concerning the vibration state will be explained. In this embodiment, as shown in FIG. 1, a conversation microphone 15 is used as a sensor.

The conversation microphone 15 is connected to a microphone interface section 24 through a selector switch 23. At the time of making a conversation, a movable contact 23m of the selector switch 23 is connected with a fixed contact 23a on a microphone interface section 24 side. With the connection as described above, at the time of conversation, the sound of talk by the user is picked up by the conversation microphone 15, and the picked up sound is subjected to sound signal process by the microphone interface section 24 or by a circuit connected with the microphone interface section 24. As the conversation microphone 15, although a microphone having a general configuration such as a condenser type or dynamic type may be used, the microphone having a sufficient degree of sensitivity to the frequencies where the vibrator vibrates is used. Additionally, in FIG. 1, an amplifier for amplifying the signals from the conversation microphone 15, a buffer or other circuits are omitted.

A fixed contact 23b on the other side of the selector switch 23 is connected to a section where the vibration is detected. In other words, when the movable contact 23m of the selector switch 23 is connected with the fixed contact 23b, the signals outputted by the conversation microphone 15 and supplied to the fixed contact 23b is supplied to a band-pass filter 25. In the band-pass filter 25, a signal component of the frequency band containing a vibration component is extracted from the sound signal that the conversation microphone 15 picks up and outputs. For example, when the frequency of the vibration at the time of activating the vibrator formed by the vibration motor 13 and the vibrating element 14 is about 150 Hz to 220 Hz, the band-pass filter 25 extracts only the frequency component in the vicinity of the 150 Hz to 220 Hz.

The signal extracted by the band-pass filter 25 is supplied to an envelope detector 26 and a phase comparator 27. The envelope detector 26 detects an amplitude component of the signal supplied by detection of envelope. The phase comparator 27 compares a template waveform supplied from a vibration-waveform template storage section 28 with a waveform of the signal supplied from the band-pass filter 25 to determine in which state the current phase is. The vibration-waveform template storage section 28 stores patterns, for example, of a waveform in a signal rising state, a waveform in a steady rotation state, a waveform in a signal falling state, and the like, to detect in which state the current phase is.

The amplitude information detected by the envelope detector 26 and phase information detected by the phase comparator 27 are supplied to the motor controlling circuit 29.

Additionally, an operation detection section 16 functioning as operation detection section is configured to detect that the touch panel 11 (FIG. 2) is touched by user's finger and so on, and the operation keys 12 are depressed and operated, and operation detection information obtained by the operation detection section 16 is supplied to the motor controlling circuit 29, As for a control state of the switch 22 by the motor controlling circuit 29 will be explained in the next flowchart.

Note that, switching of the selector switch 23 is also controlled on the basis of an instruction from the motor controlling circuit 29. Also, the motor controlling circuit 29 controls the activation of an ordinary vibration function such as the vibration at the time of incoming call, and a control configuration for this purpose is omitted in FIG. 1.

2. Explanation of Control State of Vibration Motor

Next, the control process of the vibration motor 13 controlled by the motor controlling circuit 29 will be explained with reference to a flowchart shown in FIG. 3.

First, it is determined whether the operation detection information obtained through the operation detection process is supplied from the operation detection section 16 to the motor controlling circuit 29 (step S11), and the process waits until the operation detection information at the time of the touch panel 11 being touched is supplied. When the operation detection information at the time of the touch panel 11 being touched is supplied, the switch 22 is made changed from an OFF position to an ON position to start rotation of the vibration motor 13. Additionally, at the same time as the start of rotation, the movable contact 23m of the selector switch 23 is made switched from the fixed contact 23a on the one side to the fixed contact 23b on the other side (step S12).

At this state, the motor controlling circuit 29 determines whether an amplitude signal V detected by the envelope detector 26 falls within a predetermined range for comparing the amplitude (step S13). In other words, the amplitude signal detected by the envelope detector 26 is defined as V0, and, when a lower limit value V1 and an upper limit value V2 for comparing the amplitude is preset, it is determined in the motor controlling circuit 29 whether a condition of lower limit value V1 amplitude signal V0≤upper limit value V2 is met. Each of the lower limit value V1 and the upper limit value V2 is set, for example, at a value sufficient for vibrating the terminal device within the amplitude values. It may be possible to only determine whether the amplitude signal V0 is equal to or higher than the lower limit value V1, without setting the upper limit value V2.

When it is determined, as a result of comparison in step S13, that the amplitude falls within the predetermined amplitude range, it is determined whether the detected phase θ falls within the predetermined phase range, on the basis of the result of the phase comparison by the phase comparator 27 (step S14). In other words, when the phase detected by the conversation microphone 15 is defined as θ0, and two threshold values θ1 and θ2 for comparing the phase to be compared by the phase comparator 27 are preset, it is determined whether a condition of threshold value θ1≤phase signal θ0≤threshold value θ2 is met.

When it is determined that the phase falls within the predetermined phase range, the motor controlling circuit 29 changes the switch 22 into the OFF state to stop the vibration motor 13, and switches the movable contact 23m of the selector switch 23 into the fixed contact 23a on the one side (step S15).

On the other hand, in step S13, when the detected amplitude V0 does not meet the condition of lower limit value V1≤amplitude signal V0≤upper limit value V2, the process proceeds to step S16, and it is determined whether the elapsed time from the activation of the vibration motor 13 in step S12 exceeds a predetermined period of time. The elapsed time used in the determination is set, for example, at about 100 msec to several hundreds msec. Additionally, when the condition of threshold value θ1≤phase signal θ0≤threshold value θ2 is not met in step S14, the process proceeds to step S16, and it is determined whether the predetermined time elapses or not.

Then, when it is determined in step S16 that the predetermined time elapses from the start of the driving, the process proceeds to step S15, the vibration motor 13 is stopped and the movable contact 23m of the selector switch 23 is switched to the fixed contact 23a on the one side. On the other hand, when it is determined in step S16 that the predetermined time does not elapse from the start of the driving, the process returns to the determination of the amplitude in step S13.

Figure 3:
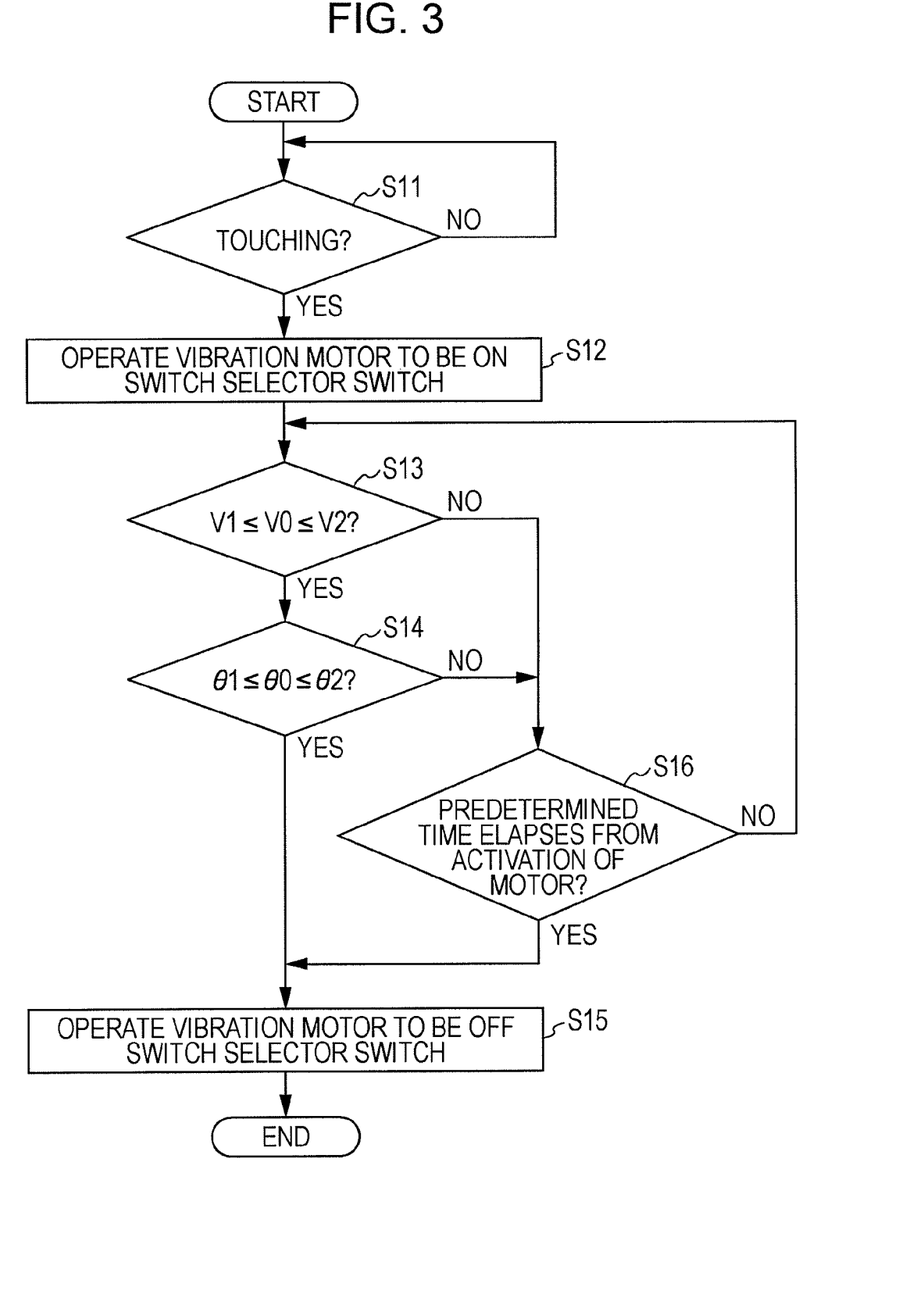
FIG. 3 is a flowchart showing an example of control process according to the embodiment of the present invention.
Figure 4:
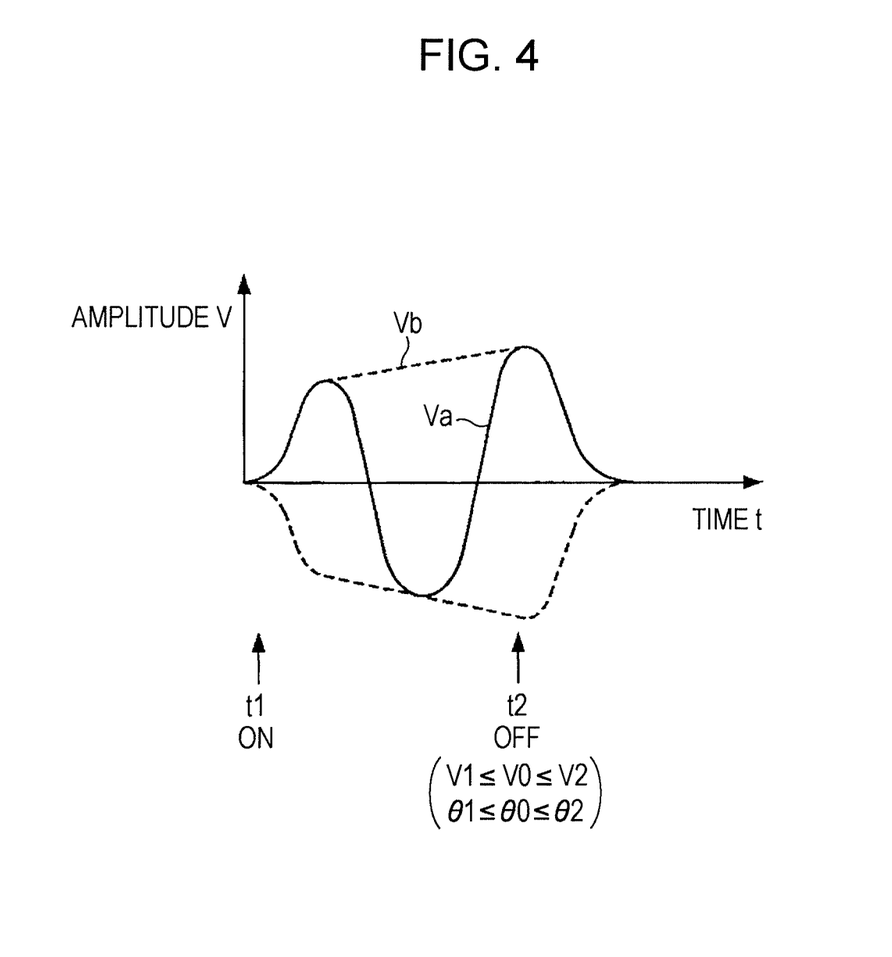
FIG. 4 is a waveform diagram showing an example of a detected signal according to the embodiment of the present invention.

The waveform in FIG. 4 illustrates an example of the signal waveform detected when the controls are performed through the process indicated by the flowchart in FIG. 3.

In the waveform in FIG. 4, the horizontal axis represents time t, while the vertical axis represents voltage V. A voltage waveform Va indicated by a solid line represents a waveform outputted by the band-pass filter 25, and a waveform indicated by a broken line Vb represents an envelope signal outputted by the envelope detector 26. The amplitude voltage V0 determined by the motor controlling circuit 29 corresponds to the voltage Vb of the envelope signal.

Since the conversation microphone 15 detects the vibration of the vibrator as the sound wave, the voltage Va outputted by the band-pass filter 25 has a waveform that moves up and down around 0 V in synchronization with the rotation of the vibrating element 14 as shown in FIG. 4, and one cycle of this waveform corresponds to one turn of the vibrating element 14. Additionally, since one cycle of the waveform corresponds to one turn of the vibrating element 14, a phase of the voltage Va corresponds to the rotational phase of the vibrating element 14.

In the example shown in FIG. 4, upon detection of the operation of the touch panel at a timing t1, the motor controlling circuit 29 operates the switch 22 to be the ON position, and the rotation of the vibration motor 13 is started. At this state, the voltage Vb of the envelope signal gradually increases from the start of the rotation, and if the rotational speed of the vibration motor 13 becomes high after a certain period of time elapses, the voltage Vb falls within the range between the lower limit value V1 and the upper limit value V2 for comparing the amplitude.

After the voltage Vb becomes high to a certain degree as described above, if the phase θ1 detected by the phase comparator 27 falls within the range of threshold value θ1≤phase signal θ0≤threshold value θ2, the switch 22 is controlled to be the OFF position, and the rotation of the vibration motor 13 is stopped. In the example shown in FIG. 4, at a timing t2, it is detected that the detected phase θ0 falls within the range of threshold value θ1≤phase signal θ0≤threshold value θ2, and the switch 22 is changed to be the OFF position. When the switch 22 is changed to be the OFF position at the timing t2 as described above, the voltage Va drops to 0 V in synchronization with the stopping of the rotation of the vibrating element 14.

As can be understood from FIG. 4, the vibration motor 13 rotates the vibrating element 14; once the rotation speed becomes high to a certain degree, control is performed such that the rotation is stopped at a point in time when the phase becomes the predetermined phase value; and, the rotation stops without rotating one or more turns at high speed because one cycle of the rotational phase corresponds to one turn. Therefore, the vibration generated by the rotation of the vibrating element 14 is extremely short-time vibration of about one turn of the vibrating element 14. This makes it possible for the user to feel the feedback of the operation of the touch panel by the vibration, and the user can obtain a favorable sense of operation of the touch panel. Especially, with the control according to this embodiment, once the amplitude becomes equal to or more than the threshold value, the vibration is stopped on the basis of the amplitude phase after the vibration is securely conveyed to the housing of the terminal device (and to the finger that touches the housing), which makes it possible to securely provides the feedback.

Additionally, this embodiment provides an effect in which, by performing control of the vibration motor 13 for generating this vibration on the basis of the amplitude and the phase of the sound waveform picked up by the conversation microphone 15, the control can be easily and securely performed. In other words, the sound waveform picked up by the conversation microphone 15 is a waveform that reflects the vibration state of the housing of the terminal device and favorably functions as the vibration sensor, and hence, by detecting the amplitude and the phase, accurate rotation control can be implement and it becomes possible to implement the minimal rotation of about one turn.

It seems that, without detecting the amplitude and the phase as described above, similar control can be implemented, for example, by driving the motor only for a period of time corresponding to one turn of the vibrating element 14. However, actually, the vibration-generation state largely differs depending upon the angle position at which the vibrating element 14 stops and the angle position from which the vibrating element 14 starts the rotational driving. Therefore, by detecting the amplitude and the phase as described in this embodiment, it becomes possible to securely generate the short-time vibration.

Additionally, in terms of configuration, since the conversation microphone 15 that the terminal device, which is a mobile phone terminal, originally has is used as the sensor for detecting the vibration, no additional sensor is necessary, whereby this embodiment can be easily obtained at low cost.

Note that, in the configuration shown in FIG. 1, this embodiment is configured such that the control is performed by detecting the rotation state by using both the amplitude value and the phase value. However, it may be possible to perform the control by detecting the rotation state by using either one of them. For example, it may be possible to detect the vibration corresponding to one turn of the vibrating element after the vibration whose amplitude exceeds a threshold value continues for a predetermined period of time. Alternatively, it may be possible to detect the vibration corresponding to one turn of the vibrating element by determining the change state of the phase.

Additionally, since this embodiment is configured such that the conversation microphone 15 is switched when used as the vibration detecting sensor, the vibration is not detected at the time of the configuration shown in FIG. 1. Therefore, it may be possible to employ the configuration in which, when the conversation microphone 15 is being used, for example, for audio input such as telephone conversation, the feedback by the vibration is not implemented even if it is detected that the touch panel is touched. If the conversation microphone and the sensor for detecting the vibration are configured as separate parts as described in the variation examples, which will be described later, the above-stated limitation is not necessary.

3. Variation Example 1: Example of Using Dedicated Microphone

Next, as a variation example of the embodiment according to the present invention, an example of using a dedicated microphone will be explained with reference to FIG. 5.

Figure 5:
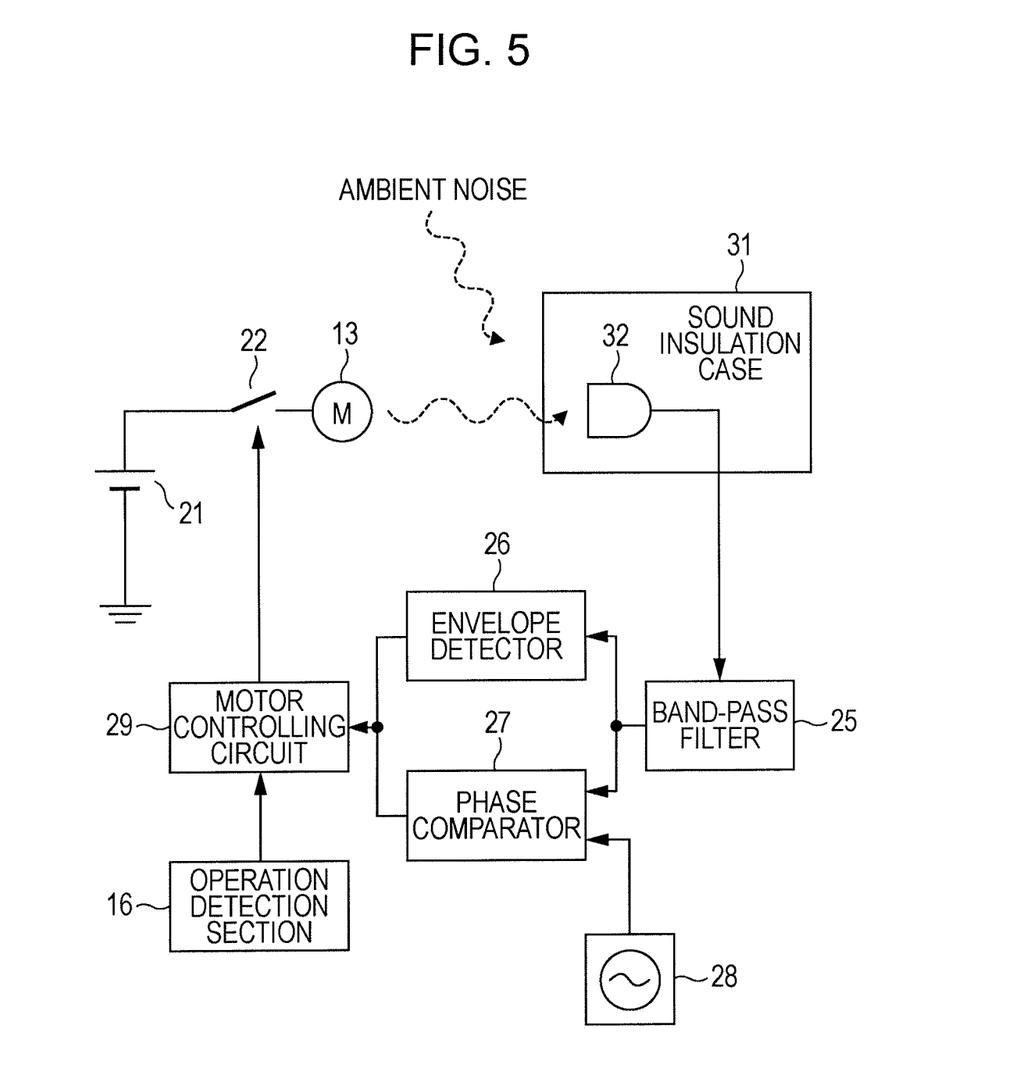
FIG. 5 is a block diagram showing a variation example (example of using a dedicated microphone) according to the embodiment of the present invention.

The example in FIG. 5 shows an example in which, in addition to the conversation microphone, which is not shown, a vibration-detection dedicated microphone 32 is provided. This vibration-detection dedicated microphone 32 is disposed within a sound insulation case 31 and thus is not affected by the sound noise from the outside. With this configuration, the vibration-detection dedicated microphone 32 detects and outputs only the vibration component as the sound wave. The sound insulation case 31 is accommodated within the housing of the terminal device. Note that the vibration-detection dedicated microphone 32 may have the same configuration as that of the conversation microphone, or may be configured, for example, as a microphone having a high sensitivity to a frequency band where the vibrator vibrates.

Additionally, the output from the vibration-detection dedicated microphone 32 is supplied to the band-pass filter 25. The output from the band-pass filter 25 is supplied to the envelope detector 26 and the phase comparator 27. Thereafter, similarly to the configuration shown in FIG. 1, the motor controlling circuit 29 controls the ON/OFF position of the switch 22 to control the rotation of the vibration motor 13. As for other portions, this embodiment is configured as is the case with the configurations shown in FIGS. 1 and 2. The control state by the motor controlling circuit 29 is similar to the flowchart shown in FIG. 3. However, in a case of the example shown in FIG. 5, a switch (the selector switch 23 shown in FIG. 1) for switching the microphone is not necessary, and hence, the control for switching the switch is not necessary.

In the case of the configuration shown in FIG. 5, since the vibration-detection dedicated microphone 32 is provided, the vibration of the vibrator can be detected even during the telephone conversation, and the feedback of the operation of the touch panel by the vibration can be implemented at all the time. Additionally, since the vibration-detection dedicated microphone 32 is accommodated in the sound insulation case 31, the outside noise is less likely to enter the detection signal, whereby the favorable control by the favorable vibration detection becomes possible.

4. Variation Example 2: Example of Using Acceleration Sensor

Next, as another variation example of the embodiment according to the present invention, an example of using an acceleration sensor will be explained with reference to FIG. 6.

Figure 6:
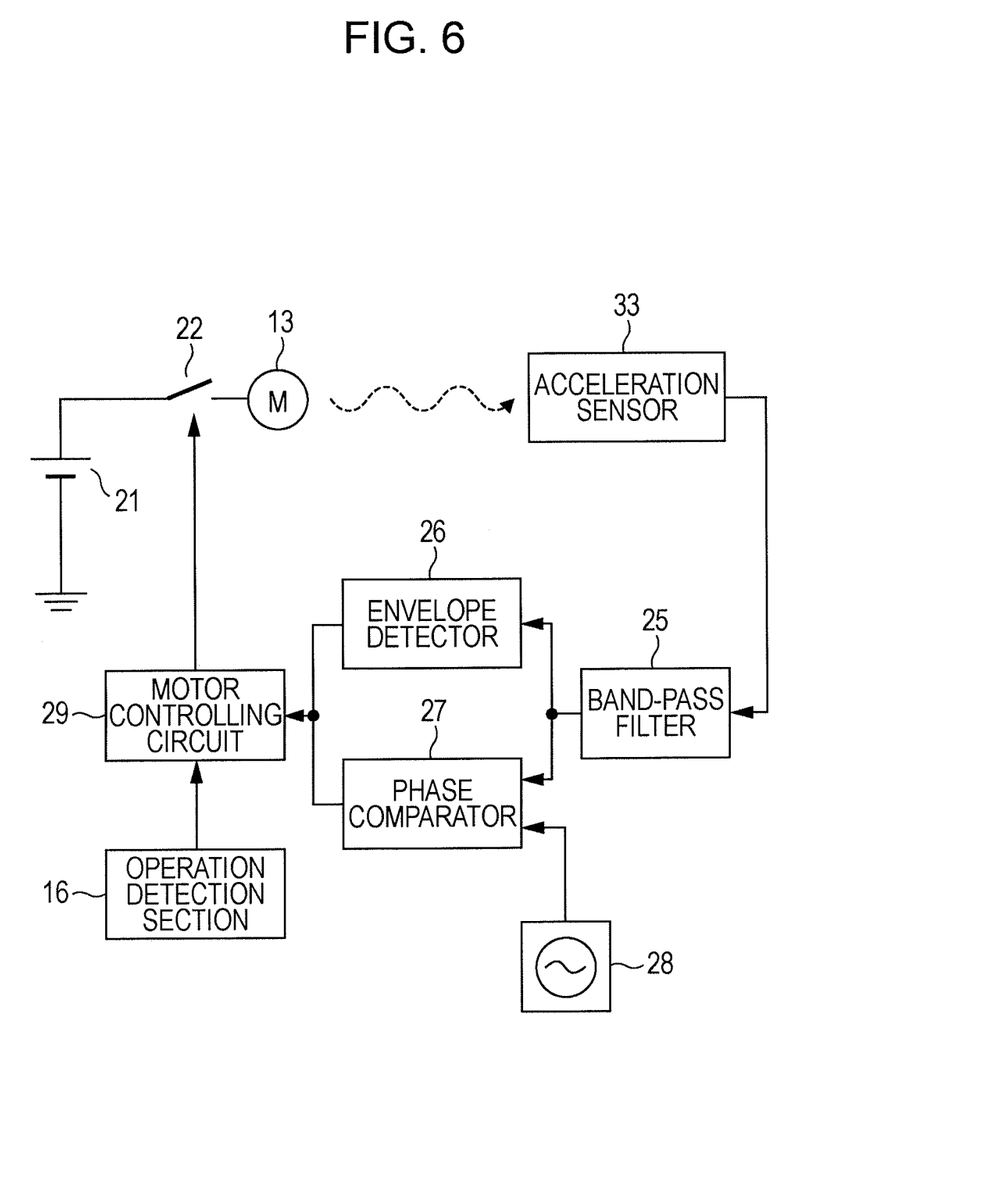
FIG. 6 is a block diagram showing a variation example (example of using an acceleration sensor) according to the embodiment of the present invention.

In the example shown in FIG. 6, in addition to the conversation microphone, which is not shown, an acceleration sensor 33 is provided. This acceleration sensor 33 is a sensor for detecting force acting on the housing of the terminal device, and, for example, for detecting the movement, direction and so on when the user shakes the terminal device. Alternatively, it may be possible to employ an acceleration sensor dedicated to detecting the vibration of the vibrator. The output from the acceleration sensor 33 is supplied to the envelope detector 26 and the phase comparator 27 through the band-pass filter 25.

Then, the output from the acceleration sensor 33 is supplied to the band-pass filter 25. The output from the band-pass filter 25 is supplied to the envelope detector 26 and the phase comparator 27. Thereafter, similarly to the configuration shown in FIG. 1, the motor controlling circuit 29 controls the ON/OFF position of the switch 22 to control the rotation of the vibration motor 13. As for other portions, this embodiment is configured as is the case with the configurations shown in FIGS. 1 and 2. The control state by the motor controlling circuit 29 is similar to the flowchart shown in FIG. 3. However, in a case of the example shown in FIG. 6, a switch (corresponding to the selector switch 23 shown in FIG. 1) for switching the sensor output is not necessary, and hence, the control for switching the switch is not necessary.

In the case of the configuration shown in FIG. 6, the vibration of the vibrator can be detected by using the acceleration sensor 33, and the feedback of the operation of the touch panel by the vibration can be implemented. In a case of the terminal device that has already had the acceleration sensor 33 itself, it is not necessary to newly provide a sensor for implementing the process in this example, whereby the vibration can be easily detected without increasing the manufacturing cost of the terminal device.

5. Variation Example 3: Example of Using Secondary Microphone

Next, as the other variation example of the embodiment according to the present invention, an example of the configuration of a terminal device in which plural conversation microphones are prepared will be explained with reference to FIGS. 6 and 7.

There exists a mobile phone having the configuration in which, as the conversation microphone, in addition to a primary microphone that directly picks up the conversation sound of the user, a secondary microphone that picks up the ambient noises is provided and the output from the secondary microphone is subtracted from the output from the primary microphone. With this configuration, the thus obtained sound signal becomes a signal in which the ambient noises are removed and the signal-to-noise ratio is improved, and only the speaking sound by the user can be picked up.

More specifically, as shown in the configuration of a terminal device 10' shown in FIG. 8, in addition to a primary conversation microphone 41, a secondary conversation microphone 42 is disposed at a position that is spaced apart from the primary conversation microphone 41 (in the upper portion on the rear side, in this example).

As shown in FIG. 7, the output from the primary conversation microphone 41 is supplied to a microphone interface section 45 through the movable contact 23m and the fixed contact 23a of the selector switch 23. Additionally, the output from the secondary conversation microphone 42 is supplied to the microphone interface section 45 through a movable contact 43m and a fixed contact 43b of a selector switch 43. Then, within the microphone interface section 45, noise removing process in which the sound signal from the secondary conversation microphone 42 is subtracted from the sound signal from the primary conversation microphone 41 is performed.

Additionally, the output from the primary conversation microphone 41 is supplied to an. adder 44 through the movable contact 23m and the fixed contact 23b of the selector switch 23. Also, the output from the secondary conversation microphone 42 is supplied to the adder 44 through the movable contact 43m and the fixed contact 43b of the selector switch 43. Then, the adder 44 subtracts the output from the secondary conversation microphone 42 from the output from the primary conversation microphone 41, and the subtracted signal is supplied to the band-pass filter 25. The output from the band-pass filter 25 is supplied to the envelope detector 26 and the phase comparator 27. Thereafter, similarly to the configuration shown in FIG. 1, the motor controlling circuit 29 controls the ON/OFF position of the switch 22 to control the rotation of the vibration motor 13. As for other portions, this embodiment is configured as is the case with the configurations shown in FIGS. 1 and 2. The control state by the motor controlling circuit 29 is similar to the flowchart shown in FIG. 3. However, in a case of the example shown in FIG. 7, it is necessary that the switch for switching the microphone is configured by the two selector switches 23, 43 and the two selector switches 23, 43 are controlled in synchronization with each other.

In the case of the configuration shown in FIG. 7, the signal supplied to the band-pass filter 25 is the signal in which the noise component is removed and the signal-to-noise ratio is improved, whereby the vibration state can be detected further favorably. In other words, the malfunction affected by the ambient noise is less likely to occur, and the feedback control can be performed favorably and stably.

Detailed description will be made on this point. Assuming that the vibration frequency of the vibrator is, for example, in the band of 150 Hz to 220 Hz, the wavelength of the sound wave caused by the vibration falls within about 2.3 m to 1.5 m. Accordingly, in a case of the mobile phone terminal in which the length of the sides of the housing is around 10 cm, the detected sound pressures are equal even if the microphone is arranged at any positions. Additionally, as shown in FIG. 8, the secondary conversation microphone 42 is usually arranged at the position that is spaced apart from the primary conversation microphone 41. Additionally, since the vibration of the vibrator occurs around the center of gravity of the housing, the vibration with the inverted phase may occur at the location where the two microphones are arranged. In this case, not only the noises are canceled by the subtraction of the subtracter 44, but also this works such that the signal component by the vibration is amplified, and as a result, the vibration can be favorably detected.

Furthermore, for the configuration for removing the noises, since the configuration of two microphones for removing the noises from the conversation sound can be utilized as it is, it is not necessary to newly add the configuration for removing the noises, and hence, the effect in which this example can be realized with the simple configuration can be obtained.

Note that, although, in each of the examples and the embodiment stated above, a case where the terminal device is applied to the mobile phone terminal has been explained, the embodiment according to the present invention can be applied to the terminal device used for other various applications. In other words, the embodiment according to the present invention can be applied to a case where, on the basis of any operation, the operation is fed back by the vibration of the vibrator.

In the above-described embodiment, as for the operation to be detected, the vibration is implemented upon detecting that the touch panel provided to the terminal device is touched. However, the feedback by similar vibration may be implemented on the basis of operation of other operation section other than the touch panel. Furthermore, as for the order of the control process, the flowchart shown in FIG. 3 only shows one preferable example, and it may be possible to realize similar control in other order than that shown in FIG. 3, provided that similar control can be implemented. The waveform shown in FIG. 4 only shows one example, and the embodiment according to the present invention may be applied to a case where the signals are detected on the basis of waveforms other than this waveform.

The present application contains subject matter related to that disclosed in Japanese Priority Patent Application JP 2010-001268 filed in the Japan Patent Office on Jan. 6, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal device, comprising:
    an operation section in which an operation instruction is performed by being touched with a finger or a pen;
    an operation detection section that detects that the finger or the pen touches the operation section;
    a vibration motor that rotates a shaft with a weight having a center of gravity at a position that is shifted from a rotation center;
    a vibration state detection section that detects state of rotational phase of the weight based upon vibration of a housing of the terminal device caused by rotation of the shaft of the vibration motor; and
    a control section that starts the rotation of the vibration motor when the operation detection section detects the touching, and stops the rotation of the vibration motor when the phase, detected by the vibration state detection section, falls within a predetermined range.

2. The terminal device according to claim 1, wherein
    the vibration state detection section further detects an amplitude of the vibration, and
    the control section stops the rotation of the vibration motor that stops when the phase detected by the vibration state detection section falls within the predetermined range and the amplitude falls within a predetermined range.

3. The terminal device according to claim 1, wherein the vibration state detection section further detects an amplitude of the vibration and the control section stops the rotation of the vibration motor, when the phase detected by the vibration state detection section falls within the predetermined range and a state, where the amplitude falls within a predetermined range is not detected, continues for a predetermined period of time.

4. The terminal device according to claim 1, wherein the vibration state detection section is a microphone that picks up a sound signal generated by the vibration of the vibration motor, and detects a rotational phase component of the vibration motor from the sound signal.

5. The terminal device according to claim 4, wherein a plurality of microphones are provided as the microphone, and a rotational phase component of the vibration motor is detected from a difference of outputs from the plurality of microphones.

6. The terminal device according to claim 4, wherein the microphone is disposed within a member that shields a sound from the outside.

7. The terminal device according to claim 1, wherein the vibration state detection section is an accelerator sensor that detects the vibration by the rotation of the vibration motor.

8. A control method of a terminal device having an operation section in which operation instruction is performed by being touched with a finger or a pen, and a vibration motor that rotates a shaft with a weight having a center of gravity at a position that is shifted from a rotation center, the method comprising the steps of:

detecting that the operation section is touched by the finger or the pen;

detecting state of rotational phase of the weight based upon vibration of a housing of the terminal device caused by rotation of the shaft by the vibration motor; and starting the rotation of the vibration motor when the touching is detected, and stopping the rotation of the vibration motor when the detected phase falls within a predetermined range.

9. The terminal device according to claim 2, wherein the vibration state detection section is a microphone that picks up a sound signal generated by the vibration of the vibration motor, and detects a rotational phase component of the vibration motor from the sound signal.

10. The terminal device according to claim 9, wherein a plurality of microphones are provided as the microphone, and a rotational phase component of the vibration motor is detected from a difference of outputs from the plurality of microphones.

11. The terminal device according to claim 9, wherein the microphone is disposed within a member that shields a sound from the outside.

12. The terminal device according to claim 3, wherein the vibration state detection section is a microphone that picks up a sound signal generated by the vibration of the vibration motor, and detects a rotational phase component of the vibration motor from the sound signal.

13. The terminal device according to claim 12, wherein a plurality of microphones are provided as the microphone, and a rotational phase component of the vibration motor is detected from a difference of outputs from the plurality of microphones.

14. The terminal device according to claim 12, wherein the microphone is disposed within a member that shields a sound from the outside.

15. The terminal device according to claim 2, wherein the vibration state detection section is an accelerator sensor that detects the vibration by the rotation of the vibration motor.

16. The terminal device according to claim 3, wherein the vibration state detection section is an accelerator sensor that detects the vibration by the rotation of the vibration motor.

* * * * *